Oct. 16, 1928.

J. W. KAHLEN 1,687,773

SURGEON'S SAFETY SAW FOR PLASTER CASTS

Filed May 4, 1927

Johannes W. Kahlen
Inventor
Attorney

Patented Oct. 16, 1928.

1,687,773

UNITED STATES PATENT OFFICE.

JOHANNES W. KAHLEN, OF VANCOUVER, BRITISH COLUMBIA, CANADA, ASSIGNOR OF ONE-HALF TO URSA LEE RHODES, OF BELLINGHAM, WASHINGTON.

SURGEON'S SAFETY SAW FOR PLASTER CASTS.

Application filed May 4, 1927. Serial No. 188,726.

This invention relates to a safety saw for the use of surgeons and others in the removal of plaster casts from patients.

The prime object of the invention is to provide a power saw which will enable a plaster cast or any portion thereof to be quickly removed from a patient with a minimum of pain or discomfort to him and an absolute assurance that owing to the special shielding devices which I employ that the saw although mechanically powered cannot through careless operation or other cause, make cutting contact with anything beyond the plaster of the cast which is under removal.

The elements of my invention may here be briefly stated, to be followed by a detailed description and reference to the drawings forming part of this application. I employ in my device a small circular saw driven preferably by an electric motor either direct coupled or by a flexible shaft according to convenience.

The saw spindle is arranged right-angularly to the motor spindle the two being connected by a pair of bevel wheels so that the speed of the saw may be suitably reduced. The saw mechanism is mounted within a suitable housing in connection with which is secured a light but rigid operating bar terminating with a hand grip.

At the foot of the housing framework and forming an extension of the operating bar is a projecting toe-piece which is an important feature of the arrangement as it acts as a guide and pilot to the saw. The latter is almost entirely covered in by special shielding devices which consist of two pivoting hoods, one sliding within the other and movable around the axis of the saw against the action of two helical springs secured to the housing and encircling the saw spindle.

The function of these spring actuated pivoting hoods is to cover the saw periphery to any required and variable amount as the work proceeds except that portion of the saw which is actually within the saw-cut of the plaster.

Figures 1, 3:
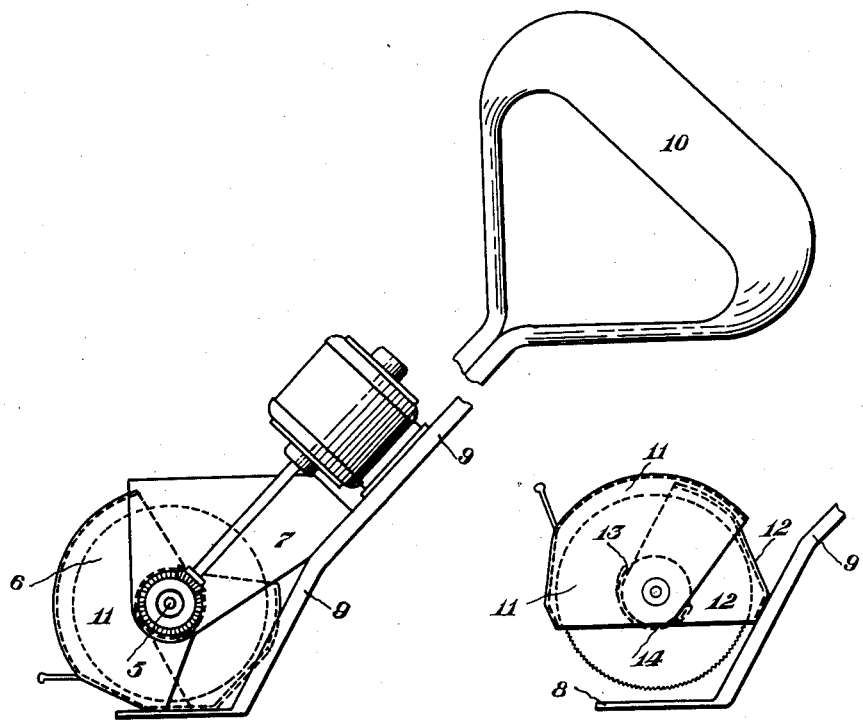
Figure 2:
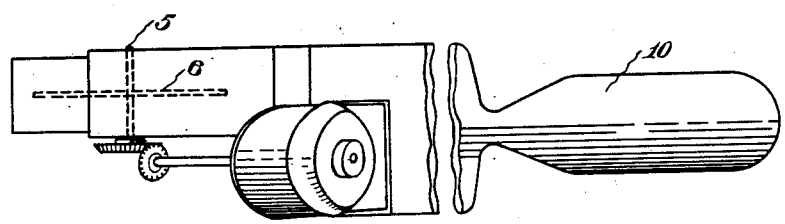

The details of the invention are shown by the drawings. Fig. 1 is a side elevation in the working position. Fig. 2 is a fore-shortened plan view of Fig. 1. Fig. 3 is a side elevation showing the shielding hoods in the raised position with the top cover removed.

Taking the drawings in detail 5 indicates the saw spindle, 6 the circular saw, 7 the housing carrying the various parts an extension of which is the toe-piece 8 which forms a guide and pilot for the sawing operation.

Secured to this is the main guiding bar 9 terminating in the hand grip 10. The housing 7 also sustains the electric motor when the saw is direct driven. Failing this a flexible shaft connected at this point is a very satisfactory arrangement.

The pivoting shields are indicated at 11 and 12, the latter being adapted to slide within the former and both being arranged to slide towards the closed position under the effect of the helical springs 13 and 14. By this arrangement there is practically no exposed portion of the circular saw which is thus entirely enclosed except the small portion actually working in the plaster.

It will be observed that the location of the hand grip in relation to the toe-piece affords complete operative control and if desired a press button switch can readily be inserted within reach of the operator's thumb for instantly bringing the motor under control; the saw is, however, so efficiently safeguarded that it is not deemed that this will be in many cases required.

The assembly of the various parts is readily effected in the manner shown in the drawings but I do not bind myself to the particular arrangement indicated except in so far as this may be limited by the wording of the claims.

Having now declared the nature of my said invention and in what manner the same is to be performed I declare that what I claim as my invention and desire to secure by Letters Patent is:—

1. In a surgeon's saw for the removal of plaster casts the combination comprising, a circular saw, a spindle secured to said saw and a housing supporting bearings for said spindle, a main guide bar secured to said housing and terminating in a hand grip for controlling the device, a power driven shaft supported in said framework, a pair of bevel wheels connecting said shaft and said saw spindle, a toe piece forming an extension of said housing and being adapted to pilot the said saw and to intercept the bottom edge of said plaster cast from the wool padding surrounding the flesh of a patient requiring the operation of said saw, two shields of the nature of hoods each adapted to cover a section of said saw, one said shield being adapted to slide within the other and both being pivotal on the axis of said spindle, helical springs secured to said housing and adapted to retain the said shielding hoods in such a position as to cover the otherwise exposed portion of said saw.

2. In a surgeon's saw for the removal of plaster casts the combination comprising, a circular saw, a spindle secured to said saw, a housing supporting bearings for said spindle and substantially sheltering said saw, a main guide bar secured to said housing and terminating in a hand grip for controlling the device, a power driven shaft supported in said framework, a pair of bevel wheels connecting said shaft and said saw spindle, a toe piece forming an extension of said housing and being adapted to pilot the said saw and to intercept the bottom edge of said plaster cast from the wool padding surrounding the flesh of a patient requiring the operation of said saw, a hood forming an extension of said housing and adapted to substantially enclose the said saw, said hood being pivotable around the axis of said spindle.

In testimony whereof I affix my signature.

JOHANNES W. KAHLEN.